(12) United States Patent
Sharma et al.

(10) Patent No.: US 7,515,049 B2
(45) Date of Patent: Apr. 7, 2009

(54) EXTENDED READ RANGE RFID SYSTEM

(75) Inventors: Arun Sharma, Cupertino, CA (US);
Daniel Fritschen, Sunnyvale, CA (US);
Daniel Liu, San Francisco, CA (US);
Norma Riley, Fremont, CA (US)

(73) Assignee: Asyst Technologies, Inc., Fremont, CA (US)

( * ) Notice: Subject to any disclaimer, the term of this patent is extended or adjusted under 35 U.S.C. 154(b) by 181 days.

(21) Appl. No.: 11/449,084

(22) Filed: Jun. 8, 2006

(65) Prior Publication Data
US 2007/0285253 A1 Dec. 13, 2007

(51) Int. Cl.
*G08B 13/14* (2006.01)
(52) U.S. Cl. .............. 340/572.6; 340/572.1; 340/10.1
(58) Field of Classification Search .............. 340/572.7, 340/10.1
See application file for complete search history.

(56) References Cited

U.S. PATENT DOCUMENTS

| | | | |
|---|---|---|---|
| 6,172,608 B1 * | 1/2001 | Cole | 340/572.1 |
| 6,340,932 B1 * | 1/2002 | Rodgers et al. | 340/572.7 |
| 7,075,437 B2 * | 7/2006 | Bridgelall et al. | 340/572.1 |
| 2003/0001725 A1 | 1/2003 | Moore | |
| 2003/0001726 A1 | 1/2003 | Moore | |
| 2003/0146839 A1 * | 8/2003 | Ehlers et al. | 340/572.7 |
| 2005/0264422 A1 | 12/2005 | Watanabe et al. | |
| 2006/0086809 A1 | 4/2006 | Shanks et al. | |
| 2006/0145815 A1 * | 7/2006 | Lanzieri et al. | 340/10.2 |
| 2006/0208899 A1 * | 9/2006 | Suzuki et al. | 340/572.7 |
| 2007/0001809 A1 * | 1/2007 | Kodukula et al. | 340/10.1 |
| 2007/0222604 A1 * | 9/2007 | Phipps et al. | 340/572.7 |

FOREIGN PATENT DOCUMENTS

GB 2 288 103 A 10/1995
WO WO 01/45038 A2 6/2001

* cited by examiner

*Primary Examiner*—Benjamin C Lee
*Assistant Examiner*—Samuel J Walk
(74) *Attorney, Agent, or Firm*—Martine Penilla & Gencarella, LLP

(57) ABSTRACT

The present invention generally comprises an apparatus that allows an RFID antenna to obtain information from an RFID tag mounted on a container. The apparatus reproduces the RF field generated by the antenna to a location proximate to the RFID tag. In one embodiment, the apparatus comprises a pickup device and a reproduction device electrically coupled with the pickup device. In another embodiment, the apparatus comprises at least one magnetic rod, which creates a magnetic path for the RF field to travel between the antenna and the RFID tag. In another embodiment, the apparatus comprises a pickup antenna and a reproduction antenna for transmitting the RF signal from the antenna proximate to the RFID tag.

18 Claims, 7 Drawing Sheets

EXTENDED READ RANGE RFID SYSTEM

FIELD OF THE INVENTION

The present invention generally relates to an improved Radio Frequency Identification (RFID) system. More specifically, the present invention comprises an RFID system for a semiconductor manufacturing facility.

BACKGROUND OF THE INVENTION

A conventional RFID system has three parts: (i) a scanning antenna, (ii) a transceiver with a decoder to interpret the data, and (iii) a transponder—the radio-frequency tag—that has been programmed with information The scanning antenna puts out radio-frequency signals in a relatively short range. The radio-frequency (RF) radiation does two things. It provides a way of communicating with the transponder tag (e.g., the RFID chip) and, in the case of passive RFID tags, it provides the RFID device with the energy to communicate. RFID devices do not need to contain batteries, and can therefore remain usable for very long periods of time.

The scanning antennas can be permanently affixed to a surface. Handheld antennas are also available. In general, an antenna can take whatever shape is necessary. When an RFID tag passes through the field of the scanning antenna, the tag detects the activation signal from the antenna. At this point, the RFID chip "wakes-up," and the tag transmits the information on its microchip to be picked up by the scanning antenna.

In addition, the RFID tag may be of one of two types—active or passive. Active RFID tags have their own power source. One advantage of an active RFID tag is that the reader can be much farther away from the tag and still receive the signal. Even though some of these devices are built to have up to a 10 year life span, they have limited life spans. Passive RFID tags, on the other hand, do not require batteries, and can be much smaller and have a virtually unlimited life span. Both passive and active tag RFID systems have a common limitation of read range to approximately 1 meter, and to even reach 1 meter efficiently, the antenna needs to be very large and therefore is expensive.

RFID tags can be read in a wide variety of circumstances, where barcodes or other optically read technologies are useless. The tag need not be on the surface of the object (and is therefore not subject to wear), the read time is typically less than 100 milliseconds, and large numbers of tags can be read at once rather than item by item.

RFID system present unique challenges in a semiconductor manufacturing environment or fabrication facility. For example, in a 300-mm fab, wafers are enclosed in containers referred to as Front-Opening Unified Pods (FOUPs), wherein an RFID tag storing corresponding carrier identification information is attached to each FOUP. Information stored in an RFID tag is retrieved by an RFID reader mounted on, for example, a load port of a processing tool. The retrieved information is then relayed to a control center, and the control center issues commands accordingly to direct operation of the processing tool. Generally, there are hundreds or of RFID readers in a certain fabrication facility. The enormous number of RFID readers adds additional cost to RFID operation.

A conventional Automated Material Handling System (AMHS) in a semiconductor fabrication facility transports FOUPs throughout the facility and tracks each container. Each FOUP contains an RFID tag that identifies, among other things, Lot-ID, how many wafers are stored in the FOUP, what stage(s) of processing the wafers have been subjected to, what is the next stage of processing to send the FOUP to, and so on. An AMHS system often needs to audit its inventory of containers. This requires positive identification of containers by reading the RFID tag. Reading the RFID tags on each container is challenging. Several steps must often be performed simply to read an RFID tag on a FOUP stored in an AMHS stocker or the AMHS transport system's buffers (also referred to herein as an overhead buffer or OHB).

In the case of a conventional stocker, the stocker controller first commands the stocker robot to access the FOUP, remove the FOUP from the storage shelf and then place the FOUP on a dedicated shelf fitted with an RFID reader. After reading the RFID tag and updating the database, the stocker controller then commands the robot to place the FOUP back onto a free storage shelf.

In the case of a conventional AMHS transport system, containers are located on a transport vehicle or on a vehicle accessible storage buffer/shelf along the transport route. To audit the material within the AMHS, the transport controller must first schedule a vehicle to access the FOUP. The vehicle then removes the FOUP from the storage shelf and sends the FOUP to the stocker (which generally has the RFID-Reader). The RFID reader enabled stocker reads the FOUP's RFID tag, transports the FOUP back to the storage shelf and then stores the FOUP back on the storage shelf the FOUP was originally removed from or another free storage shelf. Obviously, this process is very resource and time consuming. Further, while this audit process is in progress, no other work can be executed. Thus, the audit process severely limits or reduces the fab's productivity.

Placing an RFID reader on each storage shelf, on the other hand, is a very expensive and complex solution. Therefore, there is a need for an improved RFID system. The present invention provides an improved RFID system.

SUMMARY OF THE INVENTION

One aspect of the present invention is to provide a low cost solution to increase the read range of RFID tags. In one embodiment, the present invention comprises an RFID bridge that transmits an RF field emitted by an antenna proximate to an RFID tag located on a container seated in a storage location. The distance between the antenna and the RFID tag is increased many order of times compared to what is possible with conventional RF antenna and RFID tag placements.

Another aspect of the present invention is to provide an RFID system that minimizes the number of RFID readers required to read multiple RFID tags. In one embodiment, the present invention comprises a system whereby an RFID bridge is dedicated to each container storage location. A single RF antenna may be maneuvered between each pickup device of each RFID bridge and obtain the information stored in the RFID tag of each container.

Yet another aspect of the present invention is to provide an RFID system or apparatus that requires little or no external power in order to transmit the RF field between the antenna and the RFID tag. In one embodiment, the RFID bridge comprises a pickup device, a reproduction device and a signal transmitting means for transmitting the RF signal between the pickup and reproduction devices. In one embodiment, the pickup device forms a magnetic coupling with the antenna. In another embodiment, the pickup device forms an electromagnetic coupling with the antenna. The reproduction device may also form a magnetic or electromagnetic coupling with the RFID tag, Still another aspect of the present invention is to provide an RFID system that can obtain information from an RFID tag mounted on a container regardless of the placement of the RFID tag on the container (e.g., front of the container, rear of the container, top of the container, etc.). The reproduction device of each RFID bridge is configured such that, when a container is seated in the storage location, the RFID tag is proximate to the reproduction device. Thus, the reproduction device may be positioned relative to the storage location in various positions.

Another aspect of the present invention is to provide an RFID system that may quickly obtain the information stored in the RFID tags of several containers. In one embodiment, a storage location includes multiple storage areas for storing, for example, three containers. With a dedicated RFID bridge for each storage area, an antenna may be maneuvered, sometimes only a matter of inches between each pickup coil, in order to quickly obtain the information stored in each RFID tag. The containers do not have to be moved at all to obtain this information.

DETAILED DESCRIPTION OF THE INVENTION

The present invention disclosed herein and illustrated in FIGS. 1-9 provides various systems for conveying a radio-frequency (RF) field between a powered antenna and an RFID tag. The many embodiments of the present invention are suitable for applications where the RFID reader is moving with respect to the container storage location or vice versa.

Figure 1:
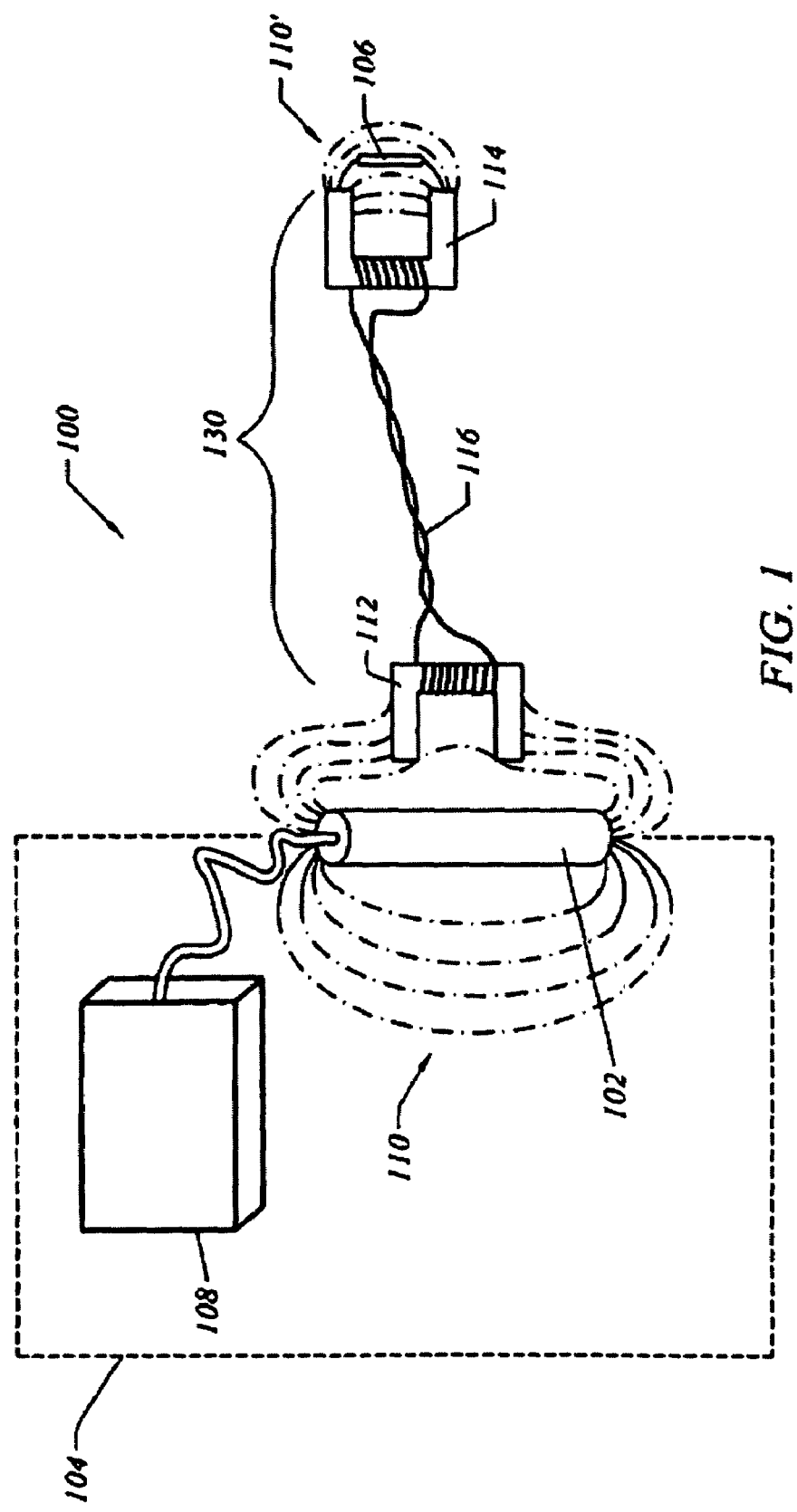
FIG. 1 is a schematic drawing of one embodiment of the present invention.

FIG. 1 illustrates an RFID system 100. In this embodiment, the RFID system 100 includes, among other things, an transmitting device 102, an RFID reader 108, an RFID tag 106 and an RFID bridge 130. The RFID transmitting device 102 and RFID reader or interrogator 108 may be housed in any number of mechanisms or devices 104. In one embodiment, the RFID transmitting device 102 and RFID reader 108 are housed in a transportation vehicle 104, such as an overhead transport (OHT) vehicle. In another embodiment, the RFID transmitting device 102 and RFID reader 108 are housed and maneuvered by a robotic arm mechanism 104 (see FIG. 9, described in more detail later). For purposes of describing the present invention only, the various embodiments of the present invention will be described herein only with reference to a robotic arm mechanism 104.

FIG. 1 shows the RFID reader 108 electrically coupled to the transmitting device 102. The RFID reader 108 is basically an RF transmitter and receiver, controlled by a microprocessor or digital signal processor. A conventional RFID reader, such as Asyst Technologies, Inc.'s model no. ATR9100, may be used. Other RFID readers may also be used with the present invention. The transmitting device 102 may comprise various devices, including, but not limited to, an RFID antenna, a wire coil, or a wire-coil with a magnetic core (e.g., a pot core, E-shaped core, U-shaped core, etc.).

Figure 6:
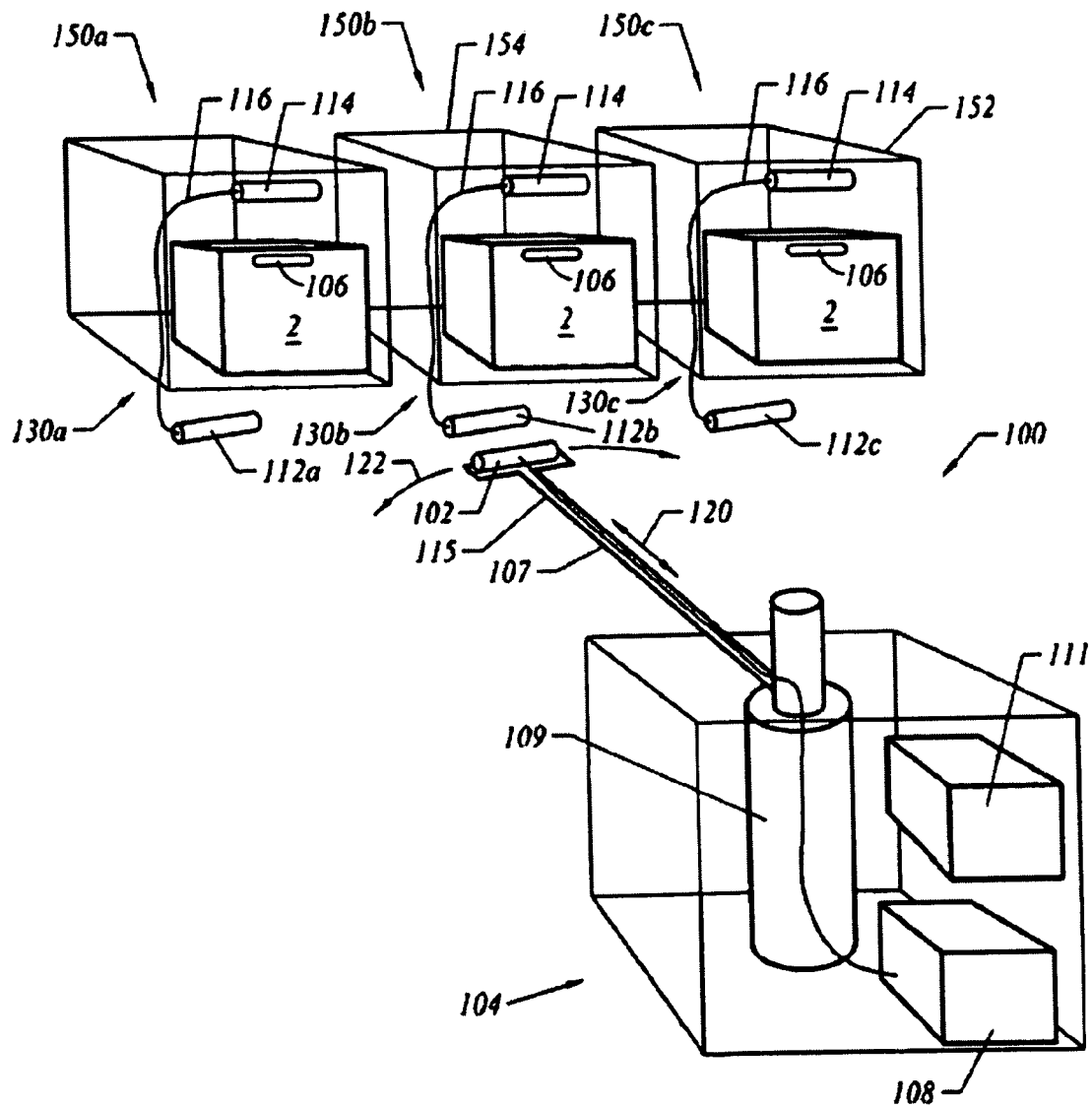
FIG. 6 is a representative drawing of an embodiment of an extension assembly, according to the present invention.

The RFID tag 106, in one embodiment, is mounted to a container 2 (see FIG. 6 for example). The RFID tag 106 may be mounted to other structures as well, such as, but not limited to, a storage location structure, a process tool or a metrology tool (as will be described in more detail later). One type of RFID tag 106 that may be used with the present invention includes Texas Instrument's low frequency RFID tag (TI-RIS). Other RFID tags may also be used with the present invention.

The RFID tag 106 and the transmitting device 102 are separated apart by a distance d1. As discussed above, conventional RFID reading systems cannot read the information stored on the RFID tag 106 unless the RFID transmitting device 102 is in close proximity to the RFID tag 106. For discussion purposes only, the distance d1, in this embodiment, comprises between 1-3 meters. In this case, a conventional RFID antenna would not be able to read the RFID tag at such a large distance. The distance d1 may comprise other distances.

Placing an RFID bridge 130 between the transmitting device 102 and the RFID tag 106 solves this problem and allows the RFID transmitting device 102 to read the RFID tag 106 from a further distance than a conventional RFID reader. In this embodiment, the RFID bridge 130 includes a pickup device or coil 112 electrically coupled with a reproduction device or coil 114 by a cable 116. The RFID bridge 130 essentially functions as a transformer coupled cable extension for conveying RF signals between the transmitting device 102 and the RFID tag 106. As shown in FIG. 1, the pickup coil 112 forms an electrical or magnetic coupling with the RFID transmitting device 102. The electrical coupling between the pickup coil 112 and the transmitting device 102 may also be formed with other passive material (e.g. non magnetic and/or non-conducting materials).

In operation, the robotic arm mechanism 104 maneuvers the transmitting device 102 proximate to the pickup coil 112 until the pickup coil 112 may receive or pick up the radio frequency signal 110 emitted by the transmitting device 102. The pickup coil 112 transmits the radio frequency signal 110 through the cable 116 to the reproduction coil 114. The reproduction coil 114 reproduces the radio frequency signal 110 (shown in FIG. 1 as RF signal 110'). The RF signal 110' envelopes the RFID tag 106, and at this point, the transmitting device 102 may read the RFID tag 106.

The RFID bridge 130 transmits the RF signal 110 between the transmitting device 102 and the RFID tag 106 essentially through two air-core transformers. The electrical coupling between the pickup coil 112 and the transmitting device 102 is, in this embodiment, through air, vacuum or any non magnetic and/or non-conducting materials. The pickup coil 112 and transmitting device 102 therefore each function as a coil of a first air-core transformer. The electrical coupling between the reproduction coil 114 and the RFID tag 106 is also through air and/or vacuum or any non magnetic and/or non-conducting materials. Thus, the reproduction coil 114 and the RFID tag 106 each function as a coil of a second air-core transformer. Of course, the electrical couplings between the coils of the first and second transformers (e.g., between the pickup coil 112 and transmitting device 102 and/or between the reproduction coil 114 and the RFID tag 106) may be though other gases too.

The RFID reader 108, through the transmitting device 102, captures data from the RFID tag 106, and then passes the data to a computer for processing. The reproduced radio signal 110' "wakes up" the RFID tag 106. Each RFID tag 106 within the range of the reproduced radio signals 110' transmits its unique identification number and data back to the transmitting device 102 through the RFID bridge 130. The transmitting device 102 electronically "listens" for these identification numbers and passes this information back to the RFID reader 108. The RFID reader 108 and RFID tag 106 have now set up a wireless "conversation" which can be used to exchange information about the object the RFID tag 106 is physically attached to (e.g., FOUP, SMIF pod, etc.). This conversation continues until the RFID tag 106 is out of range of the RFID reader 108 (e.g., the RFID tag 106 is no longer within the range of the reproduced radio signals 110') or the response from RFID tag 106 cannot be recovered by the RFID reader 108.

The pickup coil 112 is electrically connected to the reproduction coil 114 by the cable 116. The pickup coil 112 may be any distance apart from the reproduction coil 114 simply by increasing or decreasing the length of the cable 116. In one embodiment, the cable 116 is 1.5 meters long and comprises a 50 ohm impedance coaxial cable. However, any length of cable 116 may be used and the cable 116 may comprise any impedance. The pickup coil 112 and the reproduction coil 114 may communicate over other devices as well, such as, but not limited to, a printed circuit board and the like.

Figure 2:
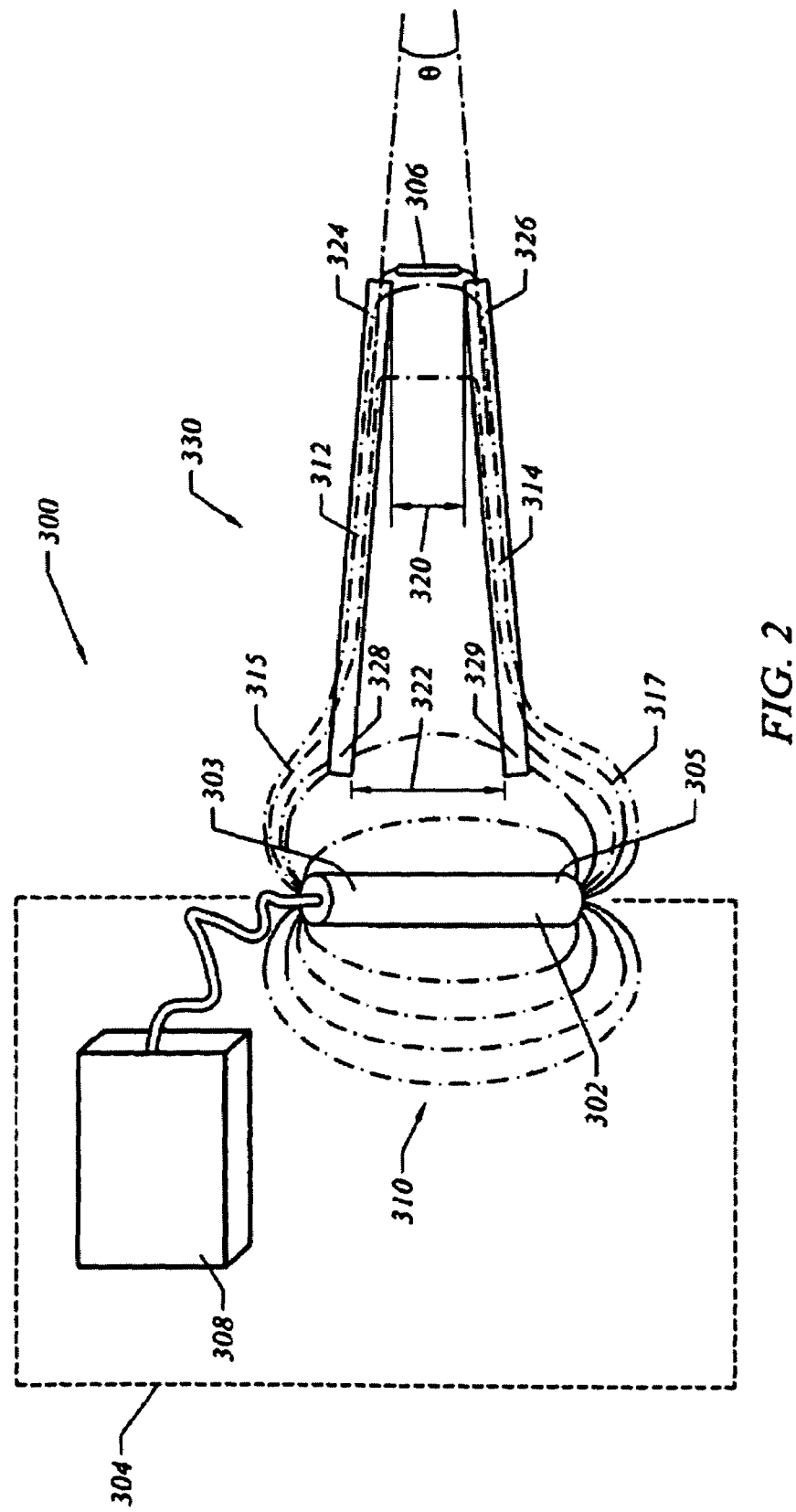
FIG. 2 is a schematic drawing of an alternative embodiment of the present invention.

FIG. 2 illustrates an RFID system 300. The system 300 includes a robotic arm mechanism 304, an RFID tag 306 and an RFID bridge 330. In this embodiment, a pair of magnetic rods (dipole topology) are used to project the radio frequency (RF) field with an explicit return material path. The robot 304 includes, among other things, an transmitting device 302 and an RFID reader 308. The transmitting device 302 and the RFID reader 308 may be electrically coupled by a cable (e.g., data cable) or may communicate with each other wirelessly.

The RFID bridge 330 comprises a first magnetic rod 312 and a second magnetic rod 314. The first magnetic rod 312 and second magnetic rod 314 may each comprise a one piece construction or multiple, closely connected pieces. In this embodiment, the magnetic material is dipole in construction so that the RFID bridge 330 provides a controlled return path 317 for the RF field back to the transmitting device 302. The FIG. 2 embodiment provides high efficiency for transferring the RF field 310 as well as being robust from interference from nearby devices and electronic behavior modification due to nearby metal or magnetic material.

In operation, the robot 304 maneuvers the transmitting device 302 proximate to the RFID bridge 330. The RFID bridge 330 receives the radio frequency 310 emitted by the transmitting device 302. In particular, the first magnetic rod 312 pulls the magnetic flux 315 from a first end 303 of the transmitting device 302. The second magnetic rod 314 pulls the magnetic flux 310 from a second end 305 of the transmitting device 302. Pulling flux 310 from the transmitting device 302 with both rods 312 and 314 simultaneously improves the RF coupling between the RFID tag 306 and the transmitting device 302. In a preferred embodiment, and for optimizing the field coupling between the transmitting device 302 and the RFID tag 306, the magnetic rods 312 and 314 are configured such that they form an angle 0 between them. As shown in FIG. 2, the gap 320 between the rods 312 and 314 near the RFID tag 306 is preferably similar in size to the height of the RFID transmitting device located inside the RFID tag 306 (not shown). The gap 322 between the rods 312 and 314 located near the transmitting device 302 is preferably similar to the distance between the first end 303 and second end 305 of the transmitting device 302. The gaps between the ends of each rod may comprise other distances.

The RFID bridge 330 maximizes the amount of magnetic flux 310 conveyed from the first ends 328 and 329 of the rods 312 and 314 to the second ends 324 and 326 of the rods 312 and 314. The RFID bridge 330 also minimizes the amount of flux leakage caused by the space 320 located between the second ends 324 and 326 of rods 312 and 314. At the same time, the RFID bridge 330 also maximizes the magnetic coupling between the transmitting device 302 and the first ends 328 and 329 of the rods 312 and 314.

The FIG. 2 (and FIG. 7) embodiment, compared to the FIG. 1 embodiment, provide a more limited reading range for the transmitting device 302. The losses in the rods 312 and 314 (the FIG. 2 embodiment) and the magnetic rod 414 (the FIG. 7 embodiment) are generally greater than the losses in the cable 116 (the FIG. 1 embodiment) based arrangement. In addition, compared to FIG. 1, the FIG. 2 and 7 embodiments are more sensitive to nearby extraneous material that may be located across the length of rods 312 and/or 314. It is therefore preferable to keep construction or support material and/or magnetic material as far away as possible from the rods 312 and 314 (or the rod 314 in the FIG. 7 embodiment).

The RFID bridge 130 shown in FIGS. 1-2, 5 and 7 is easy to install in conventional semiconductor (as well as other industries) fabrication facilities. For example, an RFID bridge 130 may be fastened to a side of an existing storage location using inexpensive hardware. The reproduction coil 114 is simply mounted to the storage location anywhere the RFID tag 106 of the container will be located near to when the container 2 is stored in the storage location. The pickup coil 112 may be mounted to the storage location 150 anywhere that is accessible to the transmitting device 102 on the robot 104. The cable 116 electrically connects to the reproduction coil 114 to the pickup coil 112. In other words, the RFID bridge 130 is a very flexible system or apparatus.

Figure 3:
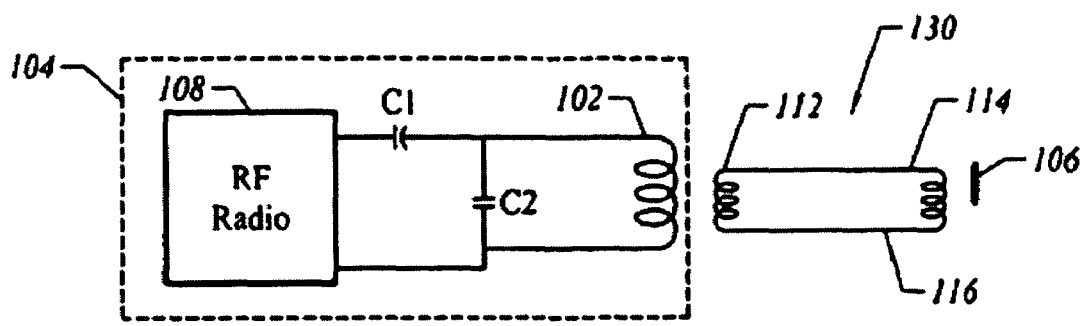
FIG. 3 is a schematic drawing of one embodiment of a circuit incorporated by the present invention.
Figure 4:
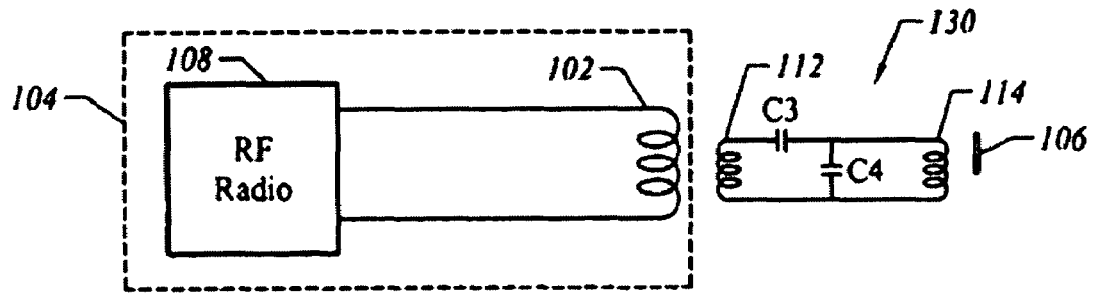
FIG. 4 is a schematic drawing of a yet another embodiment of a circuit incorporated by the present invention.
Figure 8:
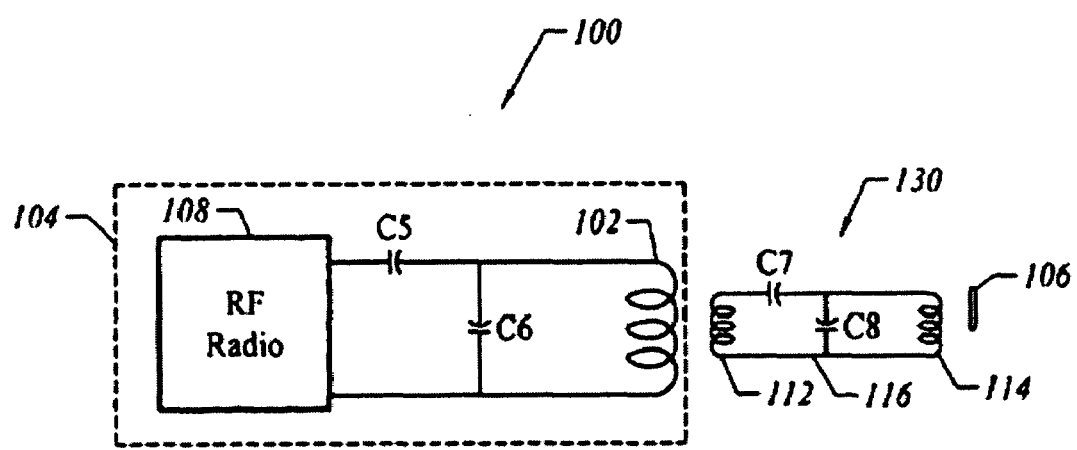
FIG. 8 is a schematic drawing of still another embodiment of a circuit incorporated by the present invention.

FIGS. 3-4 and 8 illustrate different embodiments of circuits that may be used in conjunction with the present invention. FIG. 3 illustrates a schematic view of the relationship between the robot 104, the RFID bridge 130 and the RFID tag 106. When the transmitting device 102 is proximate to the pickup coil 112 they effectively form an air-core transformer. In this embodiment, the resonant circuit that connects the RF Radio 108 and the transmitting device 102 includes capacitor C1 and capacitor C2, and inductance from transmitting device 102 (including coupled inductance from assembly 130)—forming a tuned circuit. RFID radios often prefer to see the antenna and associated cables as one resonant circuit (due to radio electronics circuit optimization constrains). Thus, the resonance circuit in the FIG. 3 embodiment is formed by capacitors C1 and C2 on the side of the cable connected to transmitting device 102. The RFID bridge 130 generally comprises a non-resonant inductive assembly (at least for the frequency of interest for the RFID reader). The RFID bridge 130 is inductively coupled to the transmitting device 102 through the air transformer resulting from the coupling between the transmitting device 102 and the pickup coil 112.

FIG. 4 illustrates that the resonance circuit may reside with the RFID bridge 130. In this embodiment, capacitors C3 and C4 are on the side of the RFID bridge 130, and the inductance of reproduction coil 114 and pickup coil 112. Thus, the transmitting device 102 and RFID reader 108 are largely a non-resonant inductive assembly (at least for the frequency of interest for the. RFID reader). The FIG. 4 embodiment provides a greater winding current and correspondingly greater magnetic flux where it is most effective.

Figure 5:
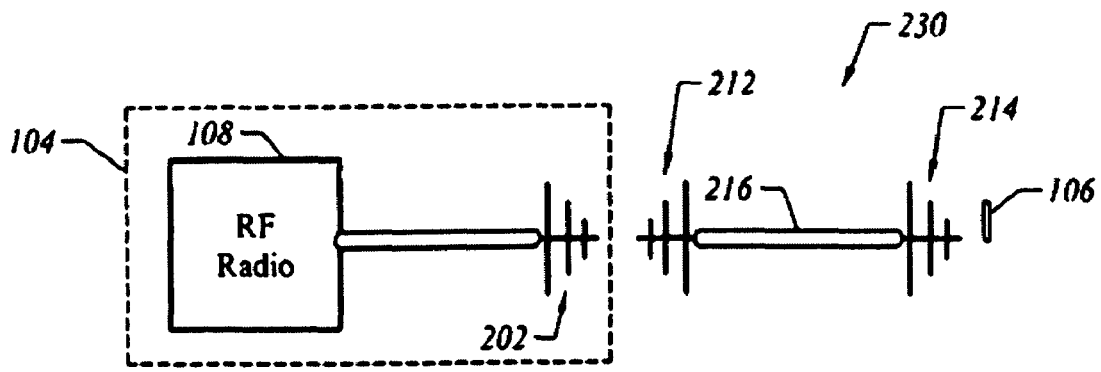
FIG. 5 is a schematic drawing of a still another embodiment of a circuit incorporated by the present invention.

FIG. 5 illustrates an RFID bridge 230. In this embodiment, the RFID bridge 230 includes a first electromagnetic (EM) antenna 212 and a second EM antenna 214. The first EM antenna 212 is electrically coupled to the second EM antenna 214 by a device 216. The device 216 may comprise, by way of example only, a cable, a printed circuit board, and the like. The first EM antenna 212 may also be wirelessly connected to the second EM antenna 214. Similar to the FIG. 1 embodiment, the second EM antenna 214 is positioned on the stocker shelf, buffer shelf, tool, etc., such that the antenna 214 is located proximate to the RFID tag 106 when the FOUP is seated or in a stationary position. The first EM antenna 212 is positioned anywhere as long as the transmitting device 202 can be easily maneuvered proximate to the EM antenna 212.

The FIG. 5 embodiment operates in a similar manner as the FIG. 1 embodiment. The first EM antenna 212 picks up the signal emitted by the transmitting device 202 when the transmitting device 202 comes within range of the first EM antenna 212. The first EM antenna 212 picks up the signal from the vehicle transmitting device 202 and conveys the signal to the second EM transmitting device 214 through the device 216 (or wirelessly if the device 216 does not exist). The second EM antenna 214 communicates with the RFID tag 106 and conveys the RFID tag information back to the first EM antenna 212. This information is relayed back to the vehicle's RFID reader 108.

FIG. 6 illustrates one embodiment of the RFID system 100. In this embodiment, each RFID bridge 130 is mounted to a storage location 150. RFID bridge 130a is mounted to storage location 150a. RFID bridge 130b is mounted to storage location 150b. RFID bridge 130c is mounted to storage location 150c. The three storage locations 150 are representative of three storage shelves in a stocker, three buffer shelves, three process tools, and the like.

The reproduction coil 114 of each RFID bridge 130 is mounted to the storage location 150. The pickup coil 112 shown in FIG. 6 is mounted to the front of each storage location 150. The pickup coil 112 may be mounted or secured to the storage shelf 150 in other location as long as the pickup coil 112 is easily accessible to the transmitting device 102 (described in more detail later). The communication device or cable 116 electrically couples the pickup coil 112 with the reproduction coil 114.

The reproduction coil 114 may be affixed or secured to any part of the storage location 150. Here, the reproduction coil 114 is mounted to an upper portion 152 of the storage location 150 such that the reproduction coil 114 is located near the RFID tag 106 mounted on the container 2 when the container 2 is stored in the storage location 150. The flexibility of the RFID bridge 130 allows the system 100 to read an RFID tag 106 regardless of where the tag is mounted on the container 2. If the RFID tag 106 were, for example, mounted to the rear face of the container 2, the reproduction coil 114 could be mounted to a rear portion 154 of the storage location 150 so that the reproduction coil 114 is able to read the RFID tag 106 while the container 2 is seated in the storage location 150.

Proximity of the reproduction coil 114 to the RFID tag 106 is necessary so that RF magnetic field of the reproduction coil 114 extends beyond the RFID tag 106 and can cross the air/vacuum gap between the reproduction coil 114 and the RFID tag 106. The other end of the RFID bridge 130, which contains the pickup coil 112, is located preferably wherever the pickup coil 112 may receive the RF magnetic field generated by the transmitting device 102 when in close proximity to the transmitting device 102.

A robot 104, having an transmitting device 102 located at the distal end 115 of the arm 107, is able to move the transmitting device 102 proximate to one of the pickup coils 112. At that point, the pickup coil 112 picks up the radio waves or signals 110 emitted by the transmitting device 102. The robot 104 does not have to extend the transmitting device 102 all the way to the RFID tag 106 on the FOUP 2. The robot 104 can move the transmitting device 102 between each pickup coil 112 to identify the inventory in each container 2 without having to move a single container 2. FIG. 6 illustrates that the robotic arm 107 may extend/retract (shown by arrow 120), rotate (shown by arrow 122) and may be raised/lowered in order to access multiple storage locations 150.

The pickup coil 112 is able to pick up or receive the signals emitted by the transmitting device 102 at from various distances. In one embodiment, the robot 104 maneuvers the transmitting device 102 within 5 cm of the pickup coil 112. The pickup coil 112 then transmits the signal to the reproduction coil 114, which communicates with the RFID tag 106. The reproduction coil 114 conveys the RFID tag information back to the pickup coil 112. This information is relayed back to the RFID reader 108. As soon as the RFID reader 108 obtains the information from a specific RFID tag 106, the robot 104 can move the transmitting device 102 to another RFID tag 106—saving valuable time in the fabrication facility. The RFID bridge 130 provides a smaller, passive and a less expensive solution to read passive RFID tags compared to the conventional method of using a large antenna and transferring the RFID tag reading power through the air.

The RFID bridge 130 provides greater flexibility in choosing the mounting location of RFID tag 106 on the container 2 than conventional RFID systems. Currently, an RFID tag must be mounted on the front of the container so that the RFID tag, when the container is stored in a stocker, faces the RFID reader and antenna mounted to the specific storage location. This tag location greatly constrains the storage orientation and the physical layout of a storage device and the robot access space and path. The RFID bridge 130 allows the RFID tag 106 to be mounted anywhere on the container 2. Thus, the RFID does not further constrain the physical relationship between the container, the storage-shelf and the robot. The pickup coil 112 simply needs to be accessible to the transmitting device 102. FIG. 6 shows that each RFID tag 106 is mounted to the front of the container 2. If the RFID tag 106 were, for example, mounted to the rear (not shown) of the container 2, the pickup coil 112 still remains in the front of the storage location 150. Only the reproduction coil 114 moves. In particular, the reproduction coil 114 moves to a position nearby the RFID tag 106. The cable 116 still connects the reproduction coil 114 to the pickup coil 112. With the pickup coil 112 remaining in front of the storage location 150, the transmitting device 102 can read the RFID tag 106 located on any surface of the container 2.

The FIG. 6 embodiment also minimizes the amount of RF interference from extraneous material/devices (e.g., mechanical support or other structures) located between the transmitting device 102 and the storage location 150. The storage shelf 150 can therefore comprise metal or another magnetic material like iron or chromium. The storage shelf 150 may comprise many other materials. The storage shelf 150 may also have other electrical/electronic devices that generate electronic/RF noise. To minimize these interferences, the cable 116 may be, for example, a twisted and/or shielded pair or co-axial, and be routed on iron channel or suspension wire (with adjoining AC power /signal wires for nearby electric/electronic devices). This type of wire experiences inconsequential degradation due to noise from a neighboring AC power cable or electronic interaction with iron metal.

Conventional RFID systems must generate high RF power in order to read an RFID tag at longer ranges because the power level necessary to read an RFID tag generally increases by a power of three with respect to the distance between the RFID antenna and the RFID tag. This limits the practical distance allowable between the RFID antenna and RFID tag for various power, EMI and safety reasons. The embodiments of the present invention described herein each require less power to operate since the RF power required to communicate between the transmitting device 102 and the pickup coil 112, and the RFID tag 106 and the reproduction coil 114, is small. Reducing the overall power requirement of the system allows the present invention to utilize a cheaper RFID radio— lowering the cost of the system. The lower RF power requirement also provides improved quality control. If the material being tracked is, for example, a wafer stored in a FOUP, it is preferable to have a lower RF energy exposure to the wafer. High RF energy may damage or degrade the quality of the wafer. A low power requirement also allows for novel uses where the application or regulatory law requires a low RF power constraint.

Figure 7:
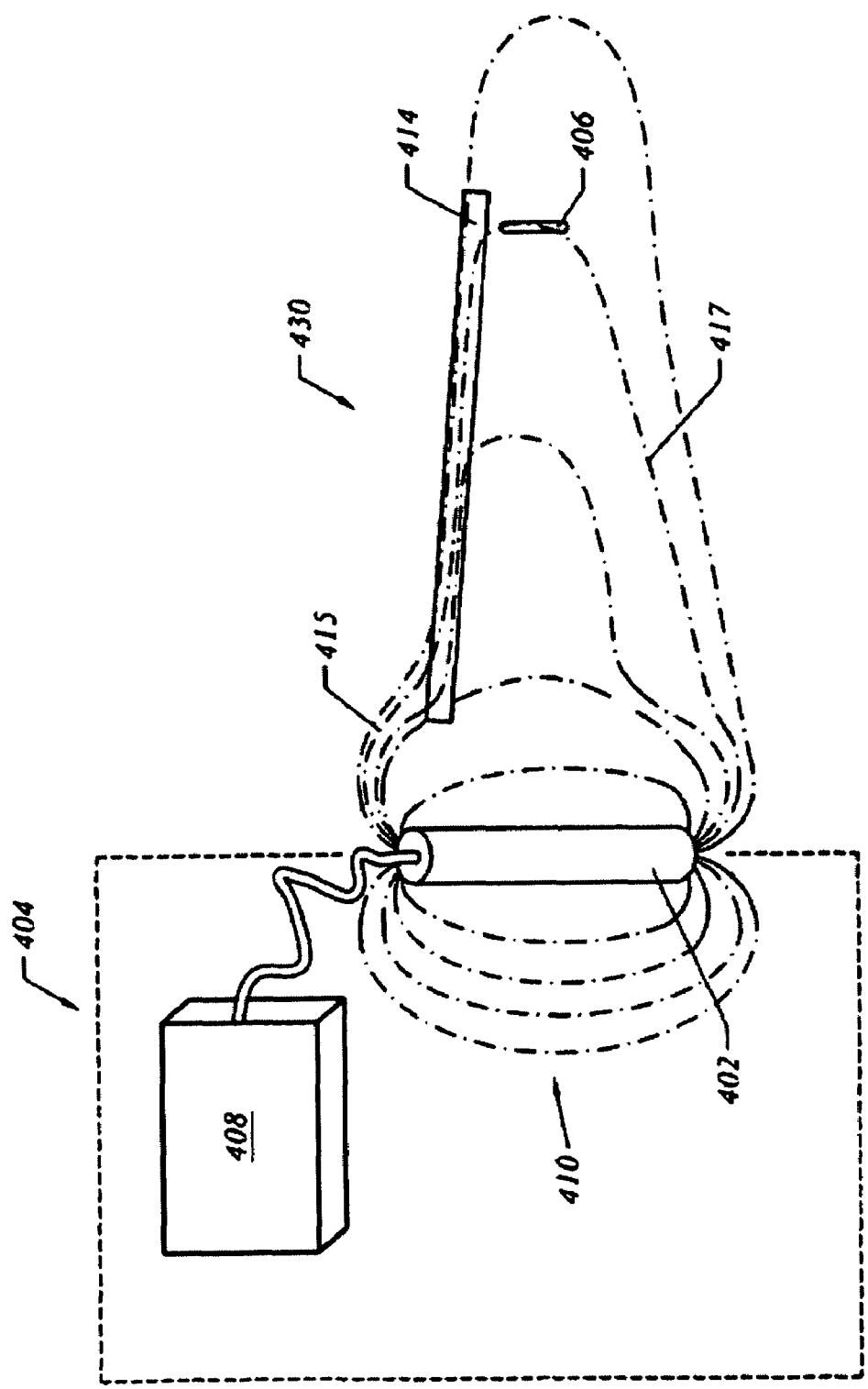
FIG. 7 is a schematic drawing of yet another embodiment of the present invention.

FIG. 7 illustrates a monopole configuration of an RFID bridge 430. In this embodiment, a single magnetic rod 414 is used to project the RF field 410 without an explicit return material path. The robot 404 includes, among other things, an transmitting device 402 and an RFID reader 408. The RFID bridge 430 comprises, in this embodiment, a single magnetic rod 414. The magnetic rod 414 may comprise a one piece construction or multiple, closely connected pieces. The magnetic rod 414 is monopole in construction, and extends the spread of the magnetic flux 410 via magnetic material low magnetic reluctance. The return path 417 for the RF field is through the air. The FIG. 7 embodiment is not as efficient as the FIG. 2 embodiment due to the return path 417 through the air that has high magnetic reluctance. The return path 417 may also be exposed to interference from nearby noise sources, and can be affected by non-systematic (not easy to determine and/or control) electronic behavior from nearby metal or magnetic materials. The RFID tag 406 is preferably located under the magnetic rod 414 to minimize these effects. The RFID tag 406 can, of course, be located elsewhere.

FIG. 8 illustrates that the RFID system 100 may include two resonant circuits. One resonant circuit exists on each side of the air transformer formed by the transmitting device 102 and the pickup coil 112. In this case, capacitors C5 and C6 comprise the resonant circuit associated with the transmitting device 102. Capacitors C7 and C8 comprise a second resonant circuit on the side of the RFID bridge 130. This configuration does pose some challenges on the electronic design (resonance split in case of more than critical-coupling) but is otherwise a viable option.

Figure 9:
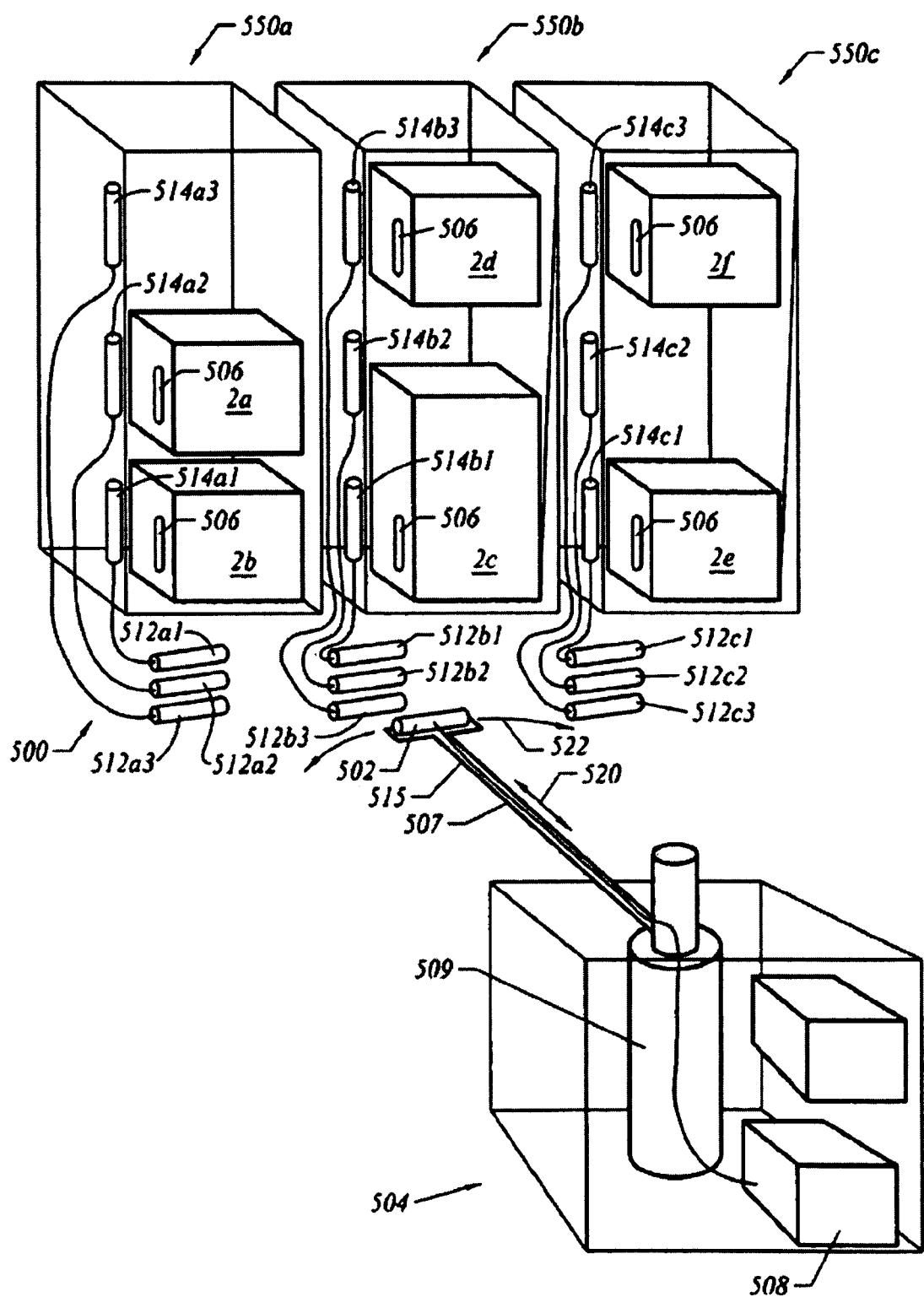
FIG. 9 is a representative drawing of another embodiment of an extension assembly, according to the present invention.

FIG. 9 illustrates an RFID system 500. In this embodiment, each storage location 550 is able to store one or more containers of various sizes and, in this embodiment, up to three containers. Thus, each storage location 550 includes three RFID bridges 530 so that the system 500 may determine the inventory of each container and/or storage location 550. Each storage location 550 may store any number of containers 2, and multiple storage locations 550 may be, for example, stacked vertically to provide a stocker-like apparatus. This system 500 provides a flexible and efficient storage space, and allows containers of various sizes to be stored in any of the storage locations 550.

FIG. 9 illustrates that storage location 550a includes three RFID bridges: RFID bridge 530a1, RFID bridge 530a2 and RFID bridge 530a3. Each RFID bridge 530a is dedicated to a storage area within the storage location 550a. For example, the reproduction coil 514a1 is dedicated to the top storage area, the reproduction coil 514a2 is dedicated to the middle storage are and the reproduction coil 514a3 is dedicated to the lower storage area. The containers 2 shown in FIG. 9 include an RFID tag 506 mounted to the left side of the container. Thus, each reproduction coil 514a is located or mounted to the storage location 550a such that, when a container 2 is seated in a storage area, the reproduction coil 514a is located proximate or near the RFID tag 506. If the RFID tags 506 were mounted to each container 2 in a different location (e.g., top of the container), the reproduction coils 514a would each be mounted to the storage location 550a in a corresponding position.

Each RFID bridge 530a includes a pickup coil 512a located in a position that is easily accessible by the transmitting device 502 (e.g., in front of the storage location 550a, below the storage location 550a if the storage location is ceiling mounted, etc.). The RFID bridge 530a1 includes a pickup coil 512a1, the RFID bridge 530a2 includes a pickup coil 512a2 and the RFID bridge 530a3 includes a pickup coil 512a3. Each pickup coil 512a is shown connected to a reproduction coil 514a by a conductor 516a. In a preferred embodiment, the pickup coils 512a1-512a3 are vertically stacked so that the robot 504 can easily maneuver the transmitting device 502 proximate to each pickup coil 512a. Each RFID bridge 530a may have other configurations. For example, the pickup coils 512a may comprise an antenna (e.g., FIG. 5), an electromagnetic device, a magnetic device, and the like.

The RFID tag 506 may also include other information such as the capacity or size of the container 2. Thus, the robot 504 may read the RFID tag 506 to determine the size of the container 2 (e.g., large capacity FOUP or small capacity FOUP), whether the storage location 550 is empty, and so on. Container presence sensors are no longer needed, eliminating active and/or powered electronics from the storage location 550. The RFID bridge also lowers material cost as well as installation and maintenance costs.

In a conventional system, an RFID antenna would have to be maneuvered to the RFID tag of each individual container in order to obtain the same information. Here, a dedicated RFID bridge for each storage area allows the RFID reader 508 to easily determine the inventory of each container 2 stored in the storage location 550a and/or determine whether the storage area is empty. In operation, the robot 504 maneuvers the transmitting device 502 proximate to the pickup coil 512a3 and obtains the inventory of the container 2b seated in the lower storage area. The robot 504 then maneuvers the transmitting device 502 proximate to the pickup coil 512a2 and obtains the inventory of the container 2a seated in the middle storage area. The robot 504 then maneuvers the transmitting device 502 proximate to the pickup coil 512a1 and determines that the upper storage area is empty. All three determinations are achieved by only moving the transmitting device 502 a small distance (e.g., the distance between pickup coil 512a1 and pickup coil 512a3). Alternately, the RFID transmitting device 502 may move within communication range of all three pickup coils 512a1, 512a2 and 512a3 and subsequently read all three pickup coils without moving any additional distance.

Storage location 550b also includes three RFID bridges: RFID bridge 530b1, RFID bridge 530b2 and RFID bridge 530b3. Each RFID bridge 530b is dedicated to a storage area within the storage location 550b. The reproduction coil 514b1 is dedicated to the top storage area, the reproduction coil 514*b*2 is dedicated to the middle storage are and the reproduction coil 514*b*3 is dedicated to the lower storage area.

Each RFID bridge 530*b* includes a pickup coil 512*b* located in a position that is easily accessible by the transmitting device 502. The RFID bridge 530*b*1 includes a pickup coil 512*b*1, the RFID bridge 530*b*2 includes a pickup coil 512*b*2 and the RFID bridge 530*b*3 includes a pickup coil 512*b*3. Each pickup coil 512*b* is shown connected to a reproduction coil 514*b* by a conductor 516*b*. In a preferred embodiment, the pickup coils 512*b*1-512*b*3 are vertically stacked so that the robot 504 can easily maneuver the transmitting device 502 proximate to each pickup coil 512*b*. Each RFID bridge 530*b* may have other configurations. For example, the pickup coils 512*b* may comprise an antenna (e.g., FIG. 5), an electromagnetic device, a magnetic device, and the like.

The storage location 550*b* is shown as storing two containers: container 2*c* and container 2*d*. The container 2*b* is a large capacity container and occupies the bottom storage area and the middle storage area. The container 2*d* is similar to the containers 2*a* and 2 shown in FIG. 9, and occupies the top storage area. Each reproduction coil 514*b* is placed on the storage location 550*b* such that the information from an RFID tag 506 on either a small capacity container or a large capacity container may be obtained. When the robot 504 maneuvers the transmitting device 502 proximate to the pickup coil 512*b*3 the RFID reader 108 obtains the information stored in the RFID tag 506 of the container 2*c*. When the robot 504 maneuvers the transmitting device 502 proximate to the pickup coil 512*b*2 the RFID reader 108 obtains no information because no RFID tag 506 is located proximate to the reproduction coil 541*b*2. When the robot 504 maneuvers the transmitting device 502 proximate to the pickup coil 512*b*1 the RFID reader 108 obtains the information stored in the RFID tag 506 of the container 2*d*.

The storage location 550*c* is shown as storing two containers: container 2*e* and container 2*f*. The container 2*e* occupies the bottom storage area and the container 2*f* occupies the top storage area. The middle storage area is empty. Each reproduction coil 514*c* is placed on the storage location 550*c* such that the information from an RFID tag 506 may be obtained from a container stored in any of the three storage areas. When the robot 504 maneuvers the transmitting device 502 proximate to the pickup coil 512*c*3 the RFID reader 108 obtains the information stored in the RFID tag 506 of the container 2*e*. When the robot 504 maneuvers the transmitting device 502 proximate to the pickup coil 512*c*2 the RFID reader 108 obtains no information because the middle storage area is empty. When the robot 504 maneuvers the transmitting device 502 proximate to the pickup coil 512*c*1 the RFID reader 108 obtains the information stored in the RFID tag 506 of the container 2*f*.

It should be appreciated that the above-described mechanisms and methods for remotely reading RFID tags are for explanatory purposes only and that the invention is not limited thereby. Having thus described a preferred embodiment of a method and system for extended read range RFIDs, it should be apparent to those skilled in the art that certain advantages of the within system have been achieved. It should also be appreciated that various modifications, adaptations, and alternative embodiments thereof may be made within the scope and spirit of the present invention. For example, the use of the RFID bridge 130 in connection with stockers may also be used in connection with other equipment within in a semiconductor fabrication facility, and it should be apparent that many of the inventive concepts described above would be equally applicable to the use of other non-semiconductor manufacturing applications.

We claim:

1. An apparatus that allows a radio frequency identification transmitting device to obtain information from a radio frequency identification tag mounted to a container when seated in a storage location, comprising:

a reproduction device positioned relative to the storage location such that, when the container is seated in the storage location, the radio frequency identification tag mounted to the container is proximate to said reproduction device wherein the reproduction device is mounted to the storage location and is separate from the container;

a pickup device positioned relative to the storage location such that an antenna of the radio frequency identification transmitting device can be maneuvered proximate to said pickup device, wherein the pick-up device position is fixed in relation to the storage location;

the radio frequency identification transmitting device transmitting a radio frequency signal to the radio frequency identification tag mounted to the container through said pickup device and said reproduction devices, wherein the transmitting device is robotically maneuvered proximate to the pickup device so as to enable the pickup device to receive and transmit the radio frequency signal emitted by the transmitting device, and wherein the container with an associated radio frequency identification tag seated in the storage location is replaceable with a different container having an associated radio frequency identification tag, the reproduction device and pickup device enabling communication between the transmitting device and the radio frequency identification tag associated with the different container.

2. The apparatus as recited in claim 1, wherein said pickup device comprises a magnetic coil.

3. The apparatus as recited in claim 1, wherein said reproduction device comprises a magnetic coil.

4. The apparatus as recited in claim 1, wherein said pickup device comprises an electromagnetic antenna.

5. The apparatus as recited in claim 1, wherein said reproduction device comprises an electromagnetic antenna.

6. The apparatus as recited in claim 1, wherein said pickup device forms an electromagnetic coupling with the radio frequency identification transmitting device when the radio frequency identification transmitting device is maneuvered proximate to said pickup device.

7. The apparatus as recited in claim 1, wherein said pickup device forms a magnetic coupling with the radio frequency identification transmitting device when the radio frequency identification transmitting device is maneuvered proximate to said pickup device.

8. The apparatus as recited in claim 1, wherein said reproduction device forms an electromagnetic coupling with the radio frequency identification tag.

9. The apparatus as recited in claim 1, wherein said reproduction device forms a magnetic coupling with the radio frequency identification tag.

10. A system for obtaining information from a radio frequency identification tag mounted on a container, comprising:

a container storage device having a plurality of storage locations, each one of said plurality of storage locations for storing a container;

a transmitting device for emitting a radio frequency signal;

a plurality of radio frequency identification bridges, each one of said plurality of radio frequency identification bridges associated with a single storage location and including:
- a reproduction device positioned relative to said storage location such that, when the container is seated in said storage location, the radio frequency identification tag mounted to the container is proximate to said reproduction device, wherein the reproduction device is mounted to the storage location and is separate from the container;
- a pickup device positioned relative to said storage location such that said transmitting device can be maneuvered proximate to said pickup device, wherein the pickup device position is fixed with relation to the storage location;

wherein the transmitting device is transmitting the radio frequency signal to a radio frequency identification tag mounted to the container through said pickup device and said reproduction device;

wherein said transmitting device is robotically maneuvered proximate to each said pickup device of each said radio frequency identification bridge to enable the pickup device of each of the radio frequency identification bridge to receive and transmit the radio frequency signal emitted by the transmitting device, and wherein the container with associated radio frequency identification tag at a storage location in the container storage device is replaceable from time-to-time with one of a plurality of different containers having an associated radio frequency identification tag, the reproduction device and pickup device enabling communication between the transmitting device and the radio frequency identification tag associated with a current one of the plurality of different containers.

11. The system as recited in claim 10, wherein said pickup device comprises a magnetic coil.

12. The system as recited in claim 10, wherein said reproduction device comprises a magnetic coil.

13. The system as recited in claim 10, wherein said pickup device comprises an electromagnetic antenna.

14. The system as recited in claim 10, wherein said reproduction device comprises an electromagnetic antenna.

15. The system as recited in claim 10, wherein said pickup device forms an electromagnetic coupling with said transmitting device when said transmitting device is maneuvered proximate to said pickup device.

16. The system as recited in claim 10, wherein said pickup device forms a magnetic coupling with said transmitting device when said transmitting device is maneuvered proximate to said pickup device.

17. The system as recited in claim 10, wherein said reproduction device forms an electromagnetic coupling with the radio frequency identification tag.

18. The system as recited in claim 10, wherein said reproduction device forms a magnetic coupling with the radio frequency identification tag.

* * * * *